United States Patent [19]

Walls

[11] Patent Number: 4,707,279

[45] Date of Patent: Nov. 17, 1987

[54] SELF-SEATING VALVE WITH COMPRESSIVE RELEASE

[76] Inventor: Gary C. Walls, R.D. #1, Marion Center, Pa. 15759

[21] Appl. No.: 932,411

[22] Filed: Nov. 19, 1986

[51] Int. Cl.⁴ ............................................. F16K 31/00
[52] U.S. Cl. ..................................... 251/339; 251/342
[58] Field of Search ................. 251/339, 342; 222/559

[56] References Cited

U.S. PATENT DOCUMENTS

| | | | |
|---|---|---|---|
| 180,891 | 8/1876 | Kraushaar | 251/353 |
| 549,678 | 11/1895 | Miller | 222/559 |
| 916,499 | 3/1909 | Tallmadge | 251/156 |
| 1,224,808 | 5/1917 | Sundell et al. | 251/340 |
| 1,602,047 | 10/1926 | Schultheis | 251/342 |
| 1,632,501 | 6/1927 | Patrick et al. | 251/340 |
| 1,669,568 | 5/1928 | McGee | 251/342 |
| 2,121,354 | 6/1938 | Johnson | 239/576 |
| 2,149,584 | 3/1939 | Davis | 251/342 |
| 2,641,376 | 6/1953 | Parziale et al. | 141/352 |
| 2,831,620 | 4/1958 | Schlicksupp | 251/342 |
| 2,892,574 | 6/1959 | Noe | 222/394 |
| 2,949,243 | 8/1960 | Raehs et al. | 239/579 |
| 3,442,487 | 5/1969 | Blackburn | 251/342 |
| 3,450,146 | 6/1969 | Edwards | 137/203 |
| 3,530,928 | 9/1970 | Swinney | 251/342 |
| 4,117,859 | 10/1978 | Illy | 251/342 |
| 4,366,836 | 1/1983 | Villari | 251/339 |

FOREIGN PATENT DOCUMENTS 115600 1/1941 Australia ............................ 251/342
628167 3/1936 Fed. Rep. of Germany .

Primary Examiner—A. Michael Chambers
Attorney, Agent, or Firm—Yeager, Robert D.; George D. Dickos; Ronald L. Kuis

[57] ABSTRACT

A self-seating valve with compressive release is provided. The invention includes a tubular valve body which is capable of elastic axial compression by means of the compression of circumferential compression rings. A diametrical bar supports a longitudinal valve stem at the end of which is affixed a valve element adjacent to a valve seat. Upon the axial compression of the valve body, the valve stem is axially displaced thereby lifting the valve from the valve seat.

9 Claims, 7 Drawing Figures

SELF-SEATING VALVE WITH COMPRESSIVE RELEASE

BACKGROUND OF THE INVENTION

1. Field of the Invention

The present invention is directed generally to valves and, more particularly to self-seating valves with compressive release.

2. Description of the Invention Background

One previous means for providing a self-seating valve is disclosed in McGee, U.S. Pat. No. 1,669,568. In that patent, a valve is disclosed which includes a valve body having flexible upper and lower walls with a foot member attached to the upper wall. The foot member is attached to a valve stem which is affixed to a valve which may rest in a seat. To actuate the McGee valve, the lower housing is displaced, thereby causing it to engage the foot member which causes the foot member to deflect the upper wall, thereby allowing the lifting of the valve from the seat.

U.S. Pat. No. 2,641,376 to Parziale, et al. discloses a dispensing cap for bottles or other containers from which liquids are to be poured. The dispensing cap includes a spout of a rigid material which is joined to a neck. The neck is in the form of a bellows and is of a material known as neoprene. The lower end portion of the bellows is then joined to a base or cap part suitable for mechanical connection to bottles or other containers. A stem is then mounted by means of threads on the upper end of the base or cap extending through the bellows and spout. A ball is mounted at the upper end of the stem. The ball forms a valve element in the mouth of the spout.

The resulting operation of the device disclosed in Parziale, et al. is dependent upon the shortening or compressing of the bellows to allow the ball to move out and away from the spout. Such a movement by the ball permits the liquid from the bottle to flow around the ball and through the spout. The dispensing cap, as described by Parziale, et al. does not, however, allow internal product pressure to act as a self-seating force for the ball in the spout. In fact, internal product pressure will act to create a force which will move the product around the ball and through the spout.

One attempt at combining the valve self-seating capabilities produced by internal product pressure with a compressive release mechanism is disclosed in U.S. Pat. No. 180,891 to Kraushaar. In U.S. Pat. No. 180,891, an apparatus is disclosed in which internal product pressure is used to seat a valve element within a valve seat. The valve element is released and product flow is permitted upon the application of an axial compressive force on a spring which is placed external to the valve body. To insure that the valve will close, the external spring urges the valve into the valve seat to aid in keeping the valve in sealing engagement with the valve seat.

A different approach for a valve or faucet which can be classified as self-seating, centers around the sole use of internal product pressure to seat the valve without the complimentary pressure of an external spring. An apparatus directed to the approach of utilizing internal product pressure to engage the valve element is disclosed in U.S. Pat. No. 1,224,808 of Sundell, et al. The apparatus disclosed in Sundell, et al. utilizes a valve element attached to a stem member which can be pressed forward to regulate the flow of product. No spring or compressive means is utilized in the seating of this valve; product pressure alone maintains the valve in the closed or engaged position.

It therefore remains desirable to provide a valve apparatus with self-seating capabilities, utilizing both product pressure and an axial valve-seating force, but which does not utilize an external or internal spring to provide the needed axial valveseating force.

SUMMARY OF THE PRESENT INVENTION

The present invention is directed to a self-seating valve with compressive release.

The valve is comprised of a tubular valve body with axial compression sections placed longitudinally along the length of the valve body. The valve body is further comprised of an open first end which forms a spout member and an open second end which is adjacent to an integral valve seat. Near the open first end of the valve body, a lifting rod is diametrically attached to the valve body. A valve stem is attached to the lifting rod, with the valve stem extending longitudinally through the valve body to the second open end. Alignment fins are attached to the valve stem to aid in positioning the valve stem within the valve body. A valve element is attached to the valve stem at or near the second open end. The valve element is urged into sealing engagement with the valve seat by the valve body compression sections.

The valve is, as stated, provided with compressive sections incorporated into the valve body. Valve self-seating is achieved through the forces generated by the axial bias of the compressive sections of the valve body as well as through internal product pressure. Both forces, internal product pressure and axial bias, act to create a sealing engagement of the valve element with the valve seat. The valve is operated by a user through the axial or longitudinal compression of the valve body which permits the lifting of the valve element from the valve seat and the regulation of flow of either liquid or granular product.

One embodiment of the present invention includes an integral base or cap which permits easy attachment to suitable containers. The valve can then be easily utilized for convenient attaching or detaching from various suitable containers.

The apparatus of the present invention provides a new, improved self-seating valve, self-seating being achieved by virtue of the axial bias produced by the valve body and by internal product pressure. Because of the ease of design and construction, the valve may be used either as a dispensing medium or as a cap for various suitable containers or for in-line flow control. These and other advantages and benefits of the present invention will become apparent from the description of a preferred embodiment described herein.

BRIEF DESCRIPTION OF THE DRAWINGS

In order that the present invention may be clearly understood and readily practiced, a preferred embodiment will now be described, by way of example only, with reference to the accompanying figures wherein.

DESCRIPTION OF A PREFERRED EMBODIMENT

Figure 3:
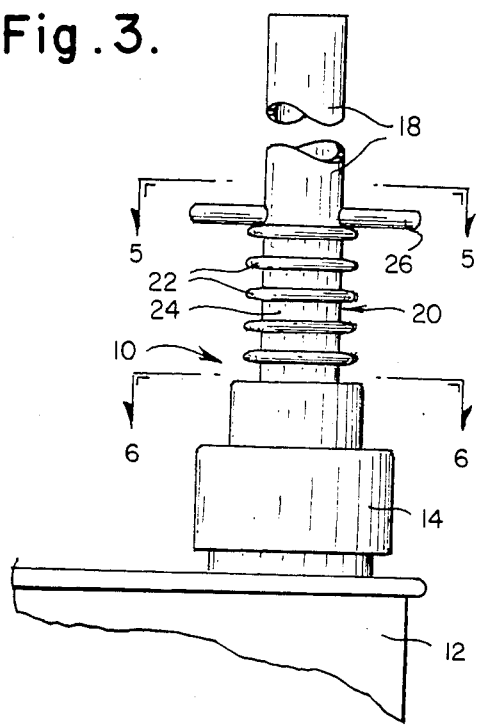
FIG. 3 is an elevation view of the device showing the valve as attached to a suitable container.
Figure 4:
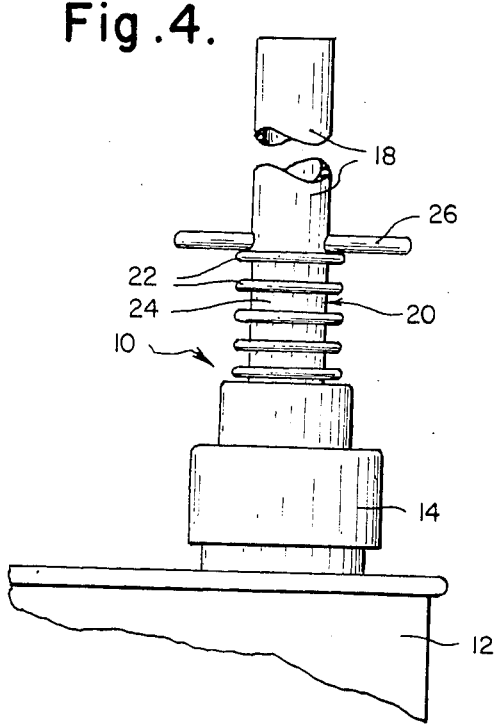
FIG. 4 is an elevation view of the valve in a compressed state.
Figure 1:
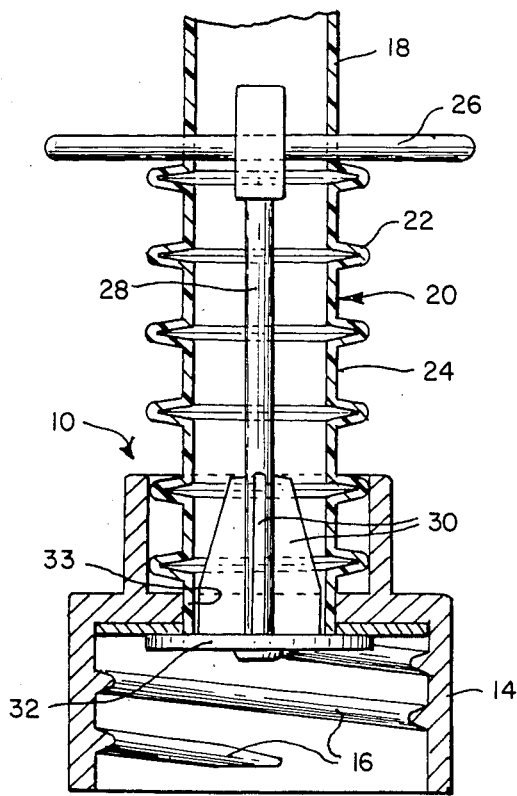
FIG. 1 illustrates in cross-section the self-seating valve with compressive release of the present invention.
Figure 2:
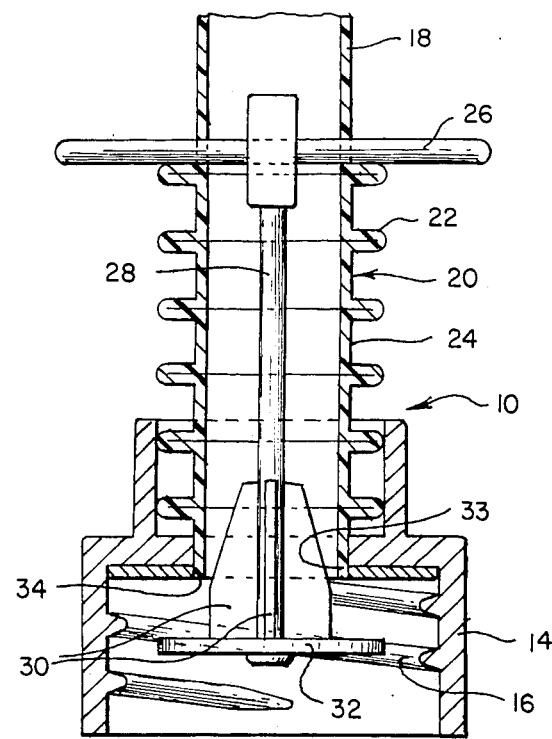
FIG. 2 shows a cross-sectional view of the valve in a compressed state.
Figure 5:
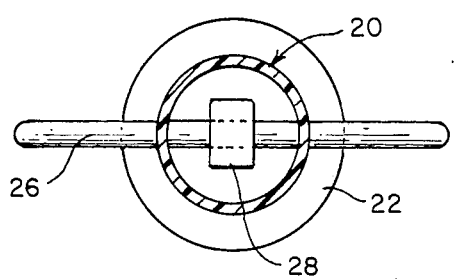
FIG. 5 shows a sectional view of the valve along lines 5—5 in FIG. 2.
Figure 6:
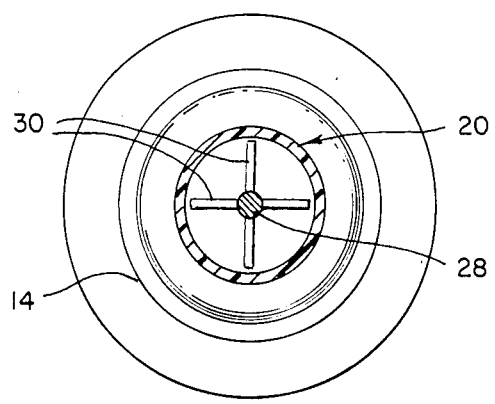
FIG. 6 shows a sectional view along lines 6—6 in FIG. 2 of the base part of the device which serves as an attaching means for the valve.

The self-seating valve with compressive release constructed according to the teachings of the present invention is illustrated in FIG. 1. The preferred embodiment shows the valve device 10 attached to a suitable container 12; however, the valve 10 may also be employed in a conduit. The means for attachment of the valve device 10 to a suitable container 12 is a valve base or cap 14 utilizing circumferential threads 16 in the inside portion of the valve base or cap 14. The circumferential threads 16 engage the corresponding receiving threads of a suitable container 12. It will be understood that the valve 10 may also be formed as an integral part of container 12. The valve device 10 is further comprised of a spout 18 of a rigid or flexible material which is connected to the upper portion of the valve body 20. The tubular valve body 20 is in an axially compressible bellows form and is constructed of any appropriate flexible material. The valve body 20 of the preferred embodiment is constructed with compression rings 22 extending out and away from the tubular valve body 20. Each compression ring 22 forms a concentric ring around the valve body 20. Between each compression ring 22, the valve body 20 forms a land 24. Each compression ring 22 is formed by the extension of the valve body 20 a fixed distance from and then returning to the valve body 20. The formation of such compression rings creates a curved protrusion end part 23 of a fixed outer radius. The flexure of compression rings 22 creates an axial biasing force acting longitudinally on the valve body 20.

Attached diametrically through the upper portion of the valve body 20 is a rigid, bar-like lifting device 26. The lifting device 26 may extend beyond the circumference of the valve body 20. This lifting device 26 is attached to an elongated stem member 28. The stem member 28 extends longitudinally through the valve body 20. The application of an axial force upon the lifting device 26 will cause a compression of the valve body 20 as the end parts 23 of each compression ring 22 will, in turn, be compressed or deformed from its normal position. In addition, the application of an axial force upon the lifting device 26 will cause a movement of the elongated stem member 28 through the valve body 20. At the lower portion of the stem member 28, alignment fins 30 and then a valve element 32 are attached. The valve body 20 is attached to the upper end portion of the cap 14 by means of an extending edge 33 engaging the inner portion of the cap 14. Integral to the valve body 20 is a valve seat 34 which sealingly engages the valve element 32 due to the axial biasing force of the compression rings 22. The alignment fins 30 act to position the stem member 28 within the valve body 20. Due to the axial bias of compression rings 22, the valve element 32 is normally urged into a closed position.

In the normal operation of the device, the valve 10 is securely attached by means of the cap 14 placed over the threaded portion of a suitable container 12. The container 12 and valve 10 are then held with one hand and the spout 18 is directed into a receiving orifice, such as the oil receiving pipe on a motor vehicle. Then by exerting longitudinal pressure on the valve body 20 by means of the bar-like lifting device 26, the end parts 23 of the rings 22 of valve body 20 are compressed and the valve stem 28 will be displaced and the valve element 32 will be moved from the valve seat 34. Displacing the valve 32 from the valve seat 34 will allow the product in the container 12 to flow through the valve body 20 and out the spout 18. When the compressive pressure on the valve body 20 is released, the axial biasing force created by rings 22 of the valve body 20 will cause the valve element to return to its sealing position in the valve seat 34. The alignment fins 30 perform the function of directing the valve element 32 into the valve seat 34. Thus, flow from the container can be controlled.

Figure 7:
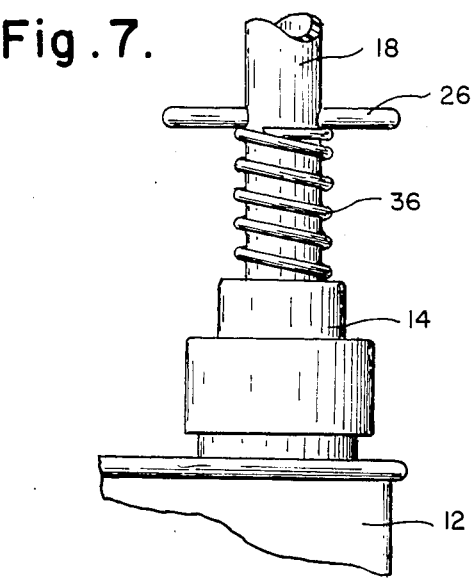
FIG. 7 illustrates an alternative embodiment utilizing a spiral valve body for the generation of an axial biasing force.

An alternative embodiment is shown in FIG. 7 in which the valve body 20 is comprised of a spiral compressive means. In this alternative embodiment, the concentric compression rings 22 are replaced by a spiraling compression ring 36 around the valve body 20 which may be axially compressed by the application of an axial force to valve body 20. The spiraling compression ring 36 creates an axial biasing force which tends to urge the valve element 32 into sealing engagement with the valve seat 34.

The foregoing detailed descriptions are given for clearness of understanding only, and no unnecessary limitations should be understood therefrom, as modifications will be obvious to those skilled in the art.

What is claimed is:

1. A valve comprising:
   (a) a flexible tubular valve body having a longitudinal section capable of elastic axial compression and having a first open end and a second open end;
   (b) a diametrical bar attached inside said tubular valve body between said first end and said longitudinal section;
   (c) an elongated valve stem attached to said diametrical bar and extending longitudinally through said valve body to a point adjacent to said second end;
   (d) a valve seat coaxial with said valve body and adjacent to said second open end; and
   (e) a valve element attached to the other end of said valve stem and of a diameter greater than that of said valve seat, said valve element being displaceable between a first position in sealing engagement with said valve seat and a second position remote from said valve seat upon the axial compression of said longitudinal section and between said second position and said first position upon the release of said axial compression.

2. The valve of claim 1 wherein said longitudinal section comprises at least one flexible annular ring disposed circumferentially about said valve body, said ring being capable of elastic axial compression.

3. The valve of claim 2, in which said longitudinal section further comprises:
   (a) a plurality of flexible annular rings; and
   (b) a corresponding plurality of tubular portions, with a tubular portion disposed between each pair of adjacent rings.

4. The valve of claim 1 wherein a tubular base member is attached at one end thereof to said second end and is provided with circumferential threads in the inside surface of the other end thereof, said threads being adapted to mechanically engage the threads on a suitable receiving container.

5. The valve of claim 1 further comprising a flexible spout attached to said first open end and in fluid communication therewith.

6. The valve of claim 1 further comprising a rigid spout attached to said first open end and in fluid communication therewith.

7. The valve of claim 1 wherein a plurality of radially extending fins are attached to said valve stem adjacent to said valve element, said fins acting as a means for centering said valve stem within said valve body.

8. The valve of claim 1 in which said longitudinal section comprises at least one flexible annular spiral ring, said spiral ring being capable of elastic axial compression.

9. The valve of claim 1 in which said diametrical bar extends radially beyond the outer diameter of said valve body on both of the opposing diametrical sides thereof so as to provide regions on said diametrical bar to which axial compression may be applied to said valve body.

* * * * *